United States Patent [19]

Donnelly et al.

[11] 4,025,681
[45] May 24, 1977

[54] ENVIRONMENTALLY DURABLE METAL HONEYCOMB STRUCTURE

[75] Inventors: Dennis J. Donnelly, Renton; Joseph Arthur Marceau, Seattle; Joseph Corey McMillan, Mercer Island; Yukimori Moji, Winslow, all of Wash.

[73] Assignee: The Boeing Company, Seattle, Wash.

[22] Filed: Mar. 24, 1975

[21] Appl. No.: 561,271

[52] U.S. Cl. .................. 428/116; 156/150; 156/197; 156/291; 204/38 R; 204/58; 427/409

[51] Int. Cl.² .......................... B31D 3/02

[58] Field of Search .......... 156/197, 291, 316, 150; 428/116, 118, 198; 29/455 LM; 228/157, 181; 204/58, 38 A, 38 E, 38 R; 427/409, 410

[56] References Cited
UNITED STATES PATENTS

| | | | |
|---|---|---|---|
| 2,674,295 | 4/1954 | Steele et al. | 156/197 |
| 3,414,489 | 12/1968 | Rogers | 204/38 A X |
| 3,458,385 | 7/1969 | Bova et al. | 428/118 |
| 3,672,972 | 6/1972 | Dorsey | 204/58 |
| 3,714,001 | 1/1973 | Dorsey | 204/58 |
| 3,734,784 | 5/1973 | Bereday et al. | 427/409 X |
| 3,799,848 | 3/1974 | Kolic et al. | 204/58 |
| 3,853,681 | 12/1974 | Kehr et al. | 156/197 |

*Primary Examiner*—David A. Simmons
*Attorney, Agent, or Firm*—Christensen, O'Connor, Garrison & Havelka

[57] ABSTRACT

An environmentally durable, aluminum honeycomb structure is obtained by surface treatment and application of a polymeric film forming substance to the aluminum foil used in manufacture of honeycomb core prior to application of the adhesive and expanding the stacked and bonded core whereby the cells of the honeycomb core structure are formed. By application of a polymeric film forming substance before bonding, all surfaces of the honeycomb core are protected from corrosion and other environmental degradations. The presence of a polymeric film forming substance on honeycomb core surfaces aids in the formation of strong core-to-face sheet bonds by improving the fillet configuration and thereby the strength obtained in face sheet-to-core bonding.

7 Claims, 8 Drawing Figures

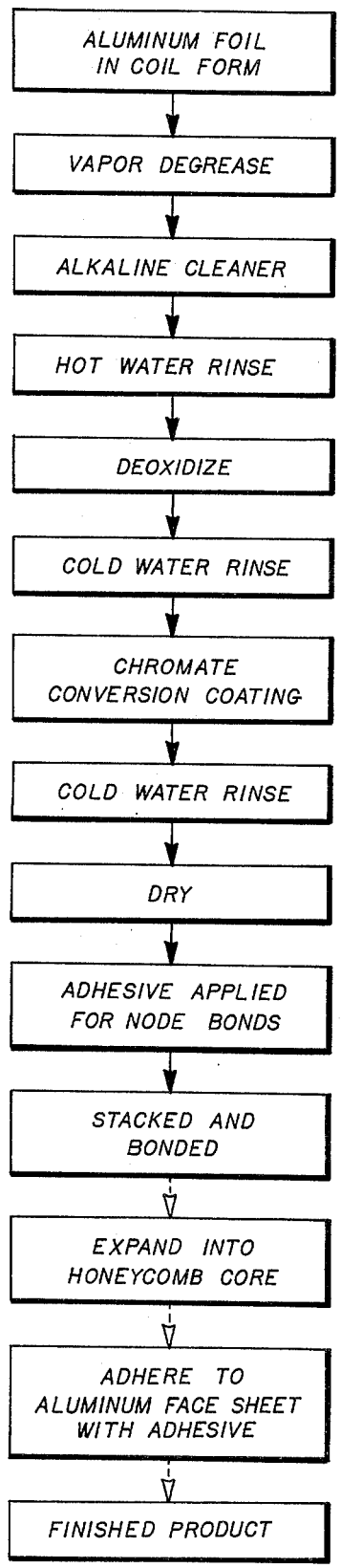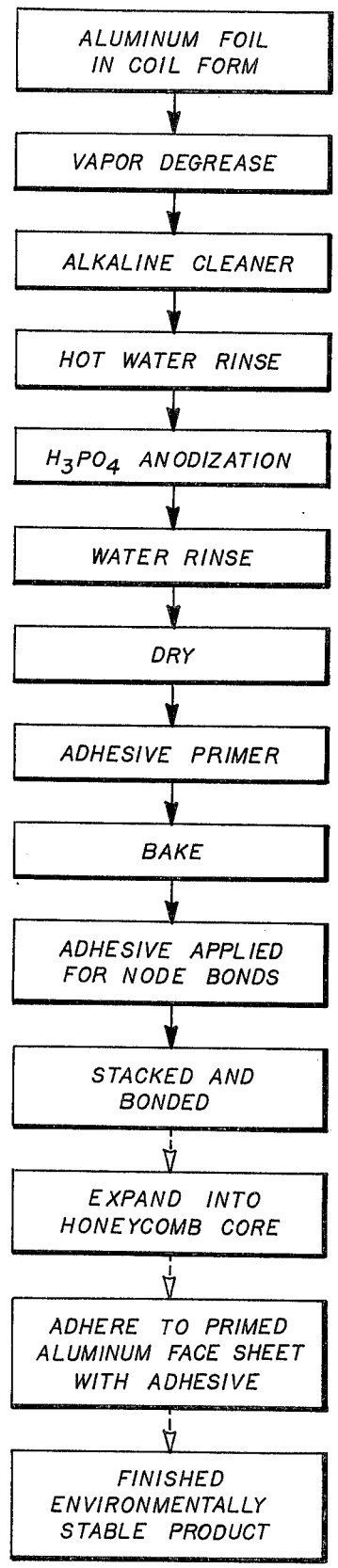
Fig. 1 (PRIOR ART)
Fig. 2 (PRESENT INVENTION)

Fig. 4
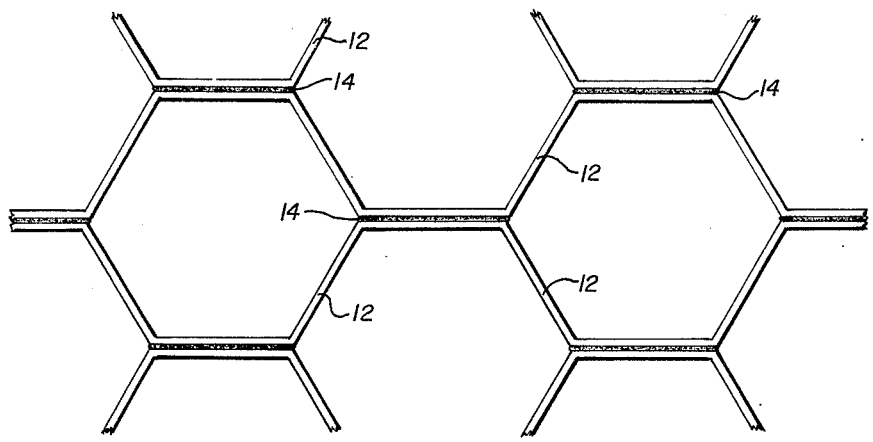
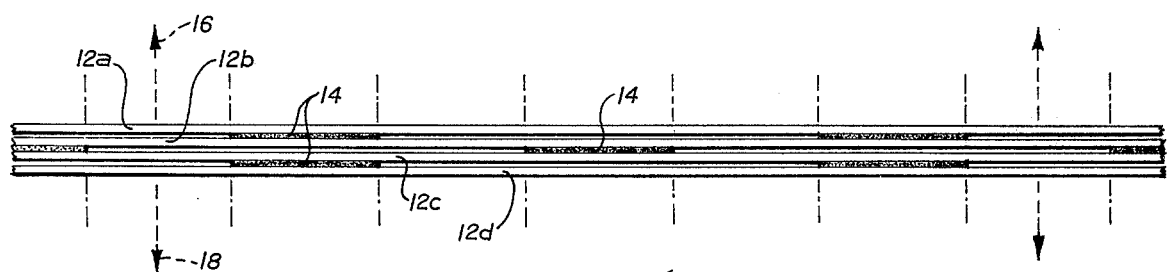
Fig. 5
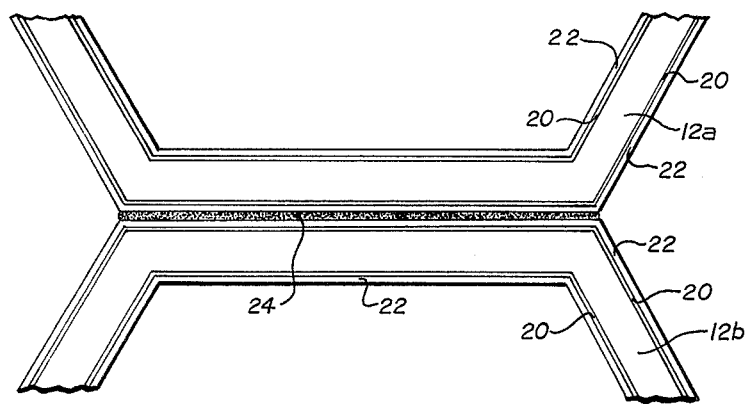
Fig. 6

ENVIRONMENTALLY DURABLE METAL HONEYCOMB STRUCTURE

BACKGROUND OF THE INVENTION

The present invention relates to a method for obtaining environmentally durable honeycomb core structures and the product produced thereby. More particularly, this invention relates to a method for preparing a honeycomb core structure in which all surfaces are protected by the presence of an extremely adherent protective coating rendering the honeycomb core structure substantially less susceptible to corrosion, delamination and other environmentally and stress-induced failures.

A variety of methods are employed in the prior art to obtain aluminum and other metal honeycomb core structures. Heretofore, all such methods either require that the surface of the aluminum foil utilized in the manufacture of the honeycomb core be bare and thereby susceptible to corrosion or that the core material, after bonding and expansion into the well-known hexagonal cell shaped core structure, be coated with a primer material such as by dipping or otherwise pouring the primer material into the interstices of the core. In the process in which primer is inserted into the core after the core is completed, a substantial amount of the primer is utilized in forming a meniscus at each node bond in the structure. For this reason an excessive amount of primer resin is used, which adds excessive cost and weight to the structure. In addition in order to assure the complete coating of all surfaces, a relatively thick and heavy coating of the primer substance is utilized. Frequently it has been found that such primed core materials have their weight raised to an excessive and unusable level by the presence of the primer substance. Less than adequate bonding at node bonds allowing environmental and stress degradation has been found to inhibit usage of prior art honeycomb structures and is not cured by application of primer resins to the interior of the honeycomb cells.

Other structures are known in which a chemical conversion utilizing amorphous chromate coating processes is used to prepare the surface of the aluminum foil prior to bonding and expanding in to the honeycomb structure. Such processes aid in the prevention of certain types of corrosion; however, they have been shown to be unsatisfactory in situations in which the honeycomb structure is exposed for long periods of time to marine atmospheres or other highly humid conditions. In addition, inadequate bonding at the node bonds between aluminum sheets has been found even with usage of the chemical conversion treatment.

Metal honeycomb structure which comprises the interior honeycomb portion is attached to face sheets by usage of an adhesive. The resulting structure is light in weight, stiff and strong and frequently possesses good thermal and acoustical characteristics. Honeycomb core construction is widely used in aircraft construction and other transportation industries wherein a lightweight, but stiff and strong, structural component is necessary. The strength of such a composite structure relies upon the bond strength of the node bonds in the honeycomb structure itself as well as the bond strength of the core-facesheet joint. Such joints must be of sufficient strength initially to meet the strength requirements of the intended purpose and, in addition, should be resistant to degradation such as by corrosion or hydration of the oxide at the adhesive-metal interface. The strength of the bond so formed is in part dependent upon the fillet size and depth into the honeycomb cell which the fillet attains. Due to surface tension and other phenomena associated with the flow of the adhesive into the honeycomb cell, the prior art structures and methods do not form the optimum fillet size and configuration for maximum bonding strength.

It is therefore an object of this invention to provide a method of producing an environmentally stable honeycomb structure. It is a related object to produce a honeycomb structure having protection against corrosion of the metal surfaces therein to enhance the usability of such honeycomb structures in humid atmospheres.

It is a further object of this invention to provide a method of constructing honeycomb structures in which strength of the joint between the honeycomb core and the facesheets utilized is enhanced. A related further object is to provide a method for forming a honeycomb structure in which the fillet size and configuration is optimized in the joint structure between the honeycomb core and the facesheets.

It is one specific object of this invention to provide a means of manufacturing aluminum honeycomb core structures in which the aluminum sheeting material utilized in forming the honeycomb structures is coated completely with a thin coating of a corrosion-resistant resin primer material placed over an anodized, polymer-receptive oxide coating on the aluminum, and in which the further step of bonding the core materials and adhering facesheets to expanded core materials are carried out upon the primed surfaces of the aluminum honeycomb core whereby optimum adhesive fillet structure is formed to enhance the corrosion resistance and strength of the resulting honeycomb structure.

These and other objects of this invention as well as certain preferred embodiments and products will become apparent from an examination of the following description of this invention taken in conjunction with the appended drawings.

SUMMARY OF THE INVENTION

Accordingly, the method involved in this invention broadly comprises phorphoric acid anodization of the surfaces and then completely covering all surfaces of the metal foil utilized in forming a honeycomb structure prior to the application of adhesive materials at the necessary locations to form node bonds for the formation of the honeycomb structure with a corrosion resistant coating. A thin, even coating of organic protective material such as a paint primer or the like forms both the impervious protective covering to prevent corrosion of the metal and provides an improved base for application of the adhesive substance uitlized in node bond formation and in adhering the facesheets to the end edges of the completed honeycomb core. Adherence to the metal by the primer is enhanced by anodization to form a polymer receptive surface.

BRIEF DESCRIPTION OF THE DRAWINGS

FIG. 1 is a production flow diagram schematically showing the succession of processing steps utilized in the preparation of honeycomb core structures in the prior art;

FIG. 2 is a production flow diagram schematically showing a succession of processing steps utilized in carrying out the method of this invention;

FIG. 4 is an enlarged, schematic, cross-sectional view of a honecomb structure taken perpendicular to the axis of the cells of the honeycomb;

FIG. 5 is a schematic representation of the stacked and bonded metal foil before expansion into the condition shown in FIG. 4;

FIG. 6 is a much enlarged, schematic view of a node bond of a honeycomb structure prepared according to the process of this invention;

DESCRIPTION OF THE PREFERRED EMBODIMENT

Referring to FIGS. 1 and 2, the schematic flow diagram of one prior art process used for preparing aluminum surfaces for honeycomb core manufacturing may be compared to the schematic flow diagram of the process of this invention. In each flow diagram it is seen that aluminum foil, as received, is first unrolled and subjected to a degreasing and alkaline cleaning process in preparation for the surface treatment. The alkaline cleaner is then removed in a hot water rinse. After the surface has been alkaline cleaned, the surface is subjected to, in the prior art process, a deoxidation and chromate conversion coating to stabilize the aluminum surface in preparation for applying the adhesive material. In the process of this invention, the cleaned aluminum surface is subjected to an acid anodization step utilizing phosphoric acid as the electrolyte. in the event that the aluminum, as received, has a thick, adherent oxide coating or corrosion product, an aluminum deoxidizer or etchant well-known in the art may be utilized to prepare the surface prior to the acid anodization step.

After surface treatment, the chemical agent used is rinsed from the aluminum foil and the foil is dried. In the process of this invention, a primer such as an epoxy, a phenolic, an acrylic, a modified acrylic or other suitable resin is then applied on the prepared aluminum surface. The primer may be applied by use of any of the well-known primer applicationtechniques including spraying, flow coating, electrophoresis or electrostatic deposition.

The primed aluminum surfaces are then cured. A suitable adhesive material such as a modified epoxy resin or other material widely used in the industry for adhesively bonding materials is applied at specified locations on the surface of the foil to form node bonds when the foil is stacked and expanded. The foil is then bonded, cut to the desired size and expanded to make a honeycomb sandwich structure. All surfaces of the metal used for the honeycomb in the process of this invention are thus covered with an environmentally stable primer substance, adhered to an oxide coating which resists corrosive attack, whereas the prior art process leaves exposed, environmentally unstable surfaces.

DETAILS OF THE INVENTION

Figure 3:
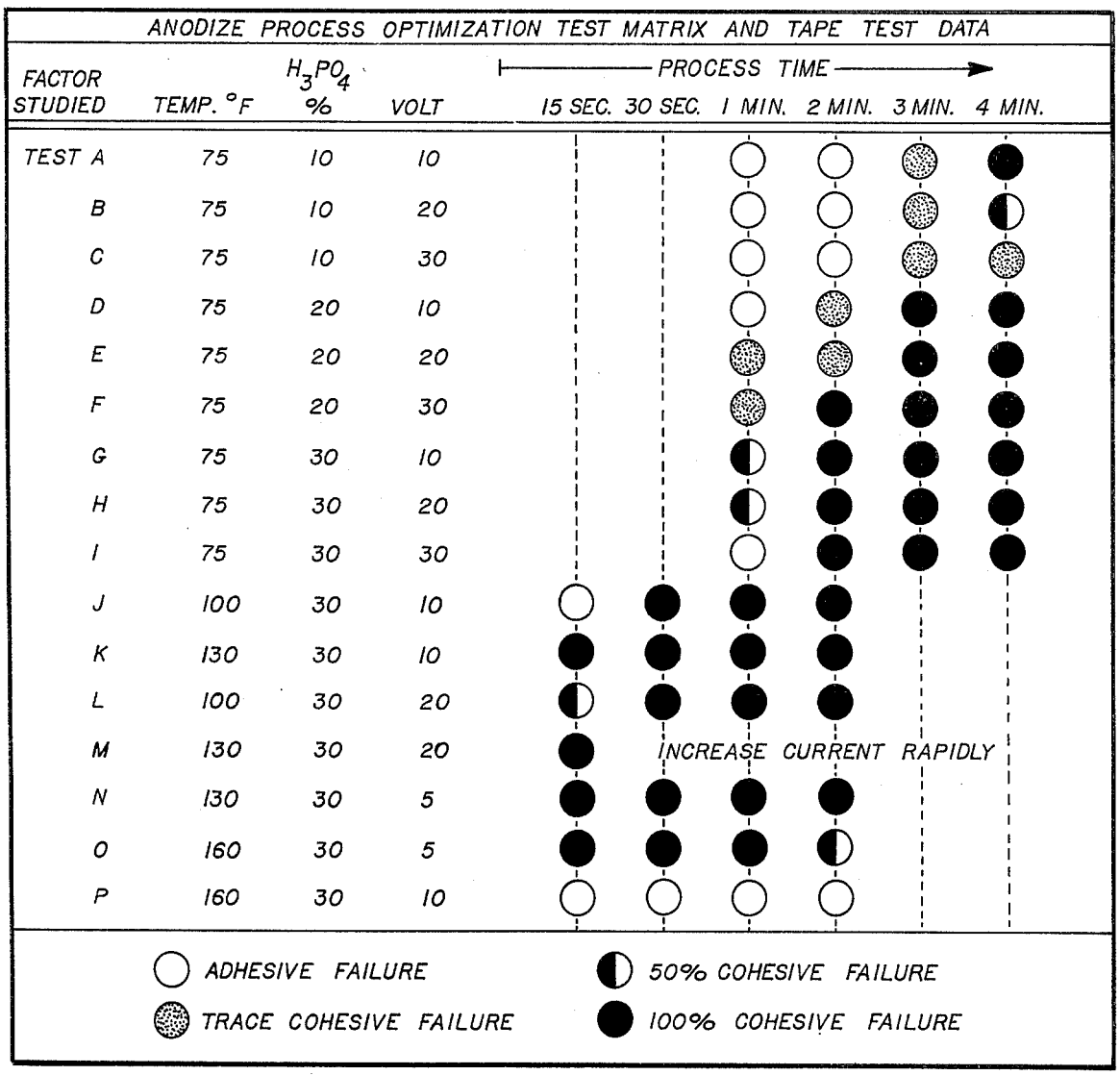
FIG. 3 is a chart showing an optimization test matrix for the anodization treatment used in preparation for application of primer to the aluminum foil.

In carrying out the preferred method of the invention, the surface of the metal foil being utilized as the core material should preferably first be activated by one of a number of wellknown techniques or by the specific process described below. In the formation of honeycomb structure from aluminum metal, a phosphoric acid anodization step is preferred; however, the processes set forth in U.S. Pat. Nos. 3,672,972, 3,714,001 or 3,799,848 may advantageously be utilized. However, a continuous process is desired, and the inventors have determined that anodization in 10% to 30% phosphoric acid in a temperature range of 75° F. to 160° F. utilizing 5 to 30 volts potential for a period of 15 seconds to 4 minutes produces acceptable products. When utilizing shorter time periods, the higher range of phosphoric acid, higher temperatures and lower voltage produce most satisfactory results. The optimization test matrix shown in FIG. 3 demonstrates that temperatures in the range of 130° F. to 160° F. with 30% phosphoric acid at 5 to 20 volts will produce a satisfactory product when the aluminum is anodized for 15 seconds to 2 minutes. Shorter time of anodization may be possible. For a continuous process it is necessary to have a minumum precessing anodization time and, therefore, the test results of FIG. 3 were obtained. These samples were processed for the time period shown at the test parameters listed, followed by washing the surface of the test specimen, drying and then applying an adhesive tape produced by Minnesota Mining & Manufacturing (No. 250). In the evaluation procedure when the adhesive on the tape adheres to and remains on the oxide layer as the tape is peeled, superior bonding characteristics are indicated. In FIG. 3, adhesive failure shown indicates that the adhesive remained on the tape when removed from the test specimen. Cohesive failure indicates that the adhesive from the tape adhered to and remained on the oxide layer as the tape was peeled from the specimen thereby indicating superior bonding characteristics are to be expected.

The evaluation test method was as follows. Three-by-six inch strips of anodized core foil (aluminum alloy 5052 H-38) were cleaned using clean gauze wet with acetone and thoroughly scrubbing the surface of the test specimen. The surface of the foil was then wiped dry using clean, dry gauze. A strip of one inch wide masking tape manufactured by Minnesota Mining & Manufacturing (No. 250) which was less than six months old from date of manufacture was placed on the foil. The tape was pressed down using two passes of a 4.5-pound, rubber covered roller. The tape was removed in one abrupt motion perpendicular to the foil and the amount of adhesive left on the foil evaluated. This test conducted on standard core material (surface deoxidized, no further surface treatment) resulted in 100% adhesive failure. Tests on three commercially available, chemically treated core materials ("Dura Core", manufactured by American Cyamid Company, and "Hexcel CR III" and "Hexcel CR/AL", both manufactured by Hexcel Corporation 11711 Dublin Boulevard, Dublin, California 94566) resulted in a high percentage of adhesive failure. A coating produced by low voltage anodization in phosphoric acid (anodization in 10% $H_3PO_4$ at 70° F. for 20 minutes at 10 volts) resulted in a failure mode which was 100% cohesive.

In an effort to obtain a continuous process for treatment of core material, the processing parameters were varied as shown in FIG. 3. As a result the anodizing conditions employed to prepare aluminum foil surfaces for subsequent coating with corrosion inhibiting adhesive primer have been found to be within the following ranges:

TABLE I

| | Temp. (°F) | Potential (Volt) | Time (Min.) | $H_3PO_4$ Concen. | Current Density (Amp/ft²) |
|---|---|---|---|---|---|
| Usable Range | 75 – 160 | 1 – 50 | 0.1 – 30 | 5 – 50% | 1 – 200 |
| Preferred Range | 100 – 140 | 5 – 20 | 0.15 – 3 | 10 – 40% | 5 – 25 |
| Most Preferred Range | 130 ± 5 | 5 – 10 | 0.2 – 2 | 30 ± 2% | 15 – 22 |

The process of this invention has been shown to produce aluminum oxide coatings which, when a primer is applied, provide environmentally stable bonds superior to the state-of-the-art honeycomb core material. The test results indicate that substantially 100% cohesive failure will be observed rather than the adhesive failure encountered in the prior art procedures. Processing is equally usable on aluminum alloys and pure aluminum, however, the optimum processing parameters will vary with composition in a manner well within the skill of the art to determine. For example, higher processing temperatures are recommended for pure aluminum than for alloys.

In FIGS. 4–8 various aspects of the product produced by this invention are shown. In FIG. 4 a view of a segment of a honeycomb core is shown looking axially through the honeycomb cell at a plane cut perpendicular to the axis of the cell. Aluminum foil walls 12 are formed into a substantially hexagonal structure having node bonds 14 at the interfaces of adjacent aluminum elements. As shown in FIG. 5, wherein a plurality of aluminum foil elements are shown stacked and bonded together, but not yet expanded into the honeycomb structure, there is seen the aluminum foil members 12a, 12b, 12 c and 12 d adhered to each adjacent aluminum foil element at node bonds 14. When expanded or pulled apart as shown by arrows 16 and 18, a structure such as that shown in FIG. 4 results.

In FIG. 6 a detailed schematic drawing very substantially enlarged is shown wherein the node bond structure itself is apparent. The aluminum foil 12a and 12b have an anodized oxide layer 20 on each side thereof upon which a layer of primer 22 has been placed. Adhesive 24 is shown in contact with the primer layer 22 on each of the two aluminum elements 12a and 12 b. As can be seen from this schematic representation, a very thin layer of primer suffices to protect the surfaces from corrosion.

Figure 7:
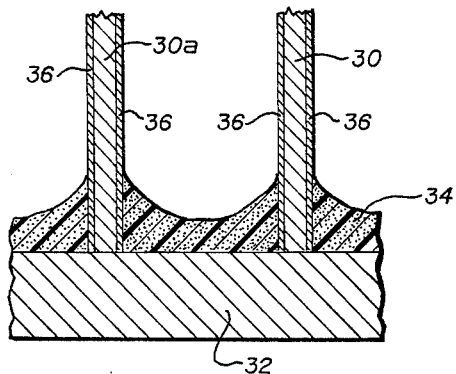
FIG. 7 is a schematic representation of the honeycomb-to-facesheet bond of the prior art.
Figure 8:
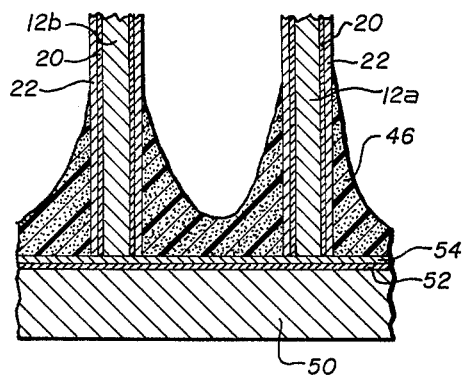
FIG. 8 is a view similar to FIG. 7, but prepared according to the process of this invention.

In FIGS. 7 and 8 the effect on adhesive fillet size through the practice of this invention is schematically presented. In FIG. 7 the prior art structure is schematically shown in which aluminum foil core material has a facesheet 32 attached by an adhesive 34. In the prior art the aluminum core 30 and 30a has an amorphous chromate chemical conversion layer 36 thereon such as is obtained by treatment with potassium dichromate or other well-known prior art surface treatments for stabilization of the aluminum surface. Since this coating 36 is an inorganic surface, it is inadequately wetted by the adhesive 34 and therefore a low fillet structure is obtained. In distinction to this prior art, in FIG. 8 a product produced by the process of this invention is shown. Core materials 40 and 40a have an anodized oxide 42 thereon, over which a primer such as an epoxy, paint-like material 44 has been placed. When primer coated material such as is described above is then contacted along the cell and edges with an adhesive, the adhesive tends to wet the surface of the primer and causes an extended fillet to form as is shown in FIG. 8. The adhesive 46 forms a full fillet 48 extending deep into the cells of the honeycomb structure. This adhesive is placed upon a facesheet 50 which has an anodized oxide surface 52 thereon to which primer coat 54 has been applied. The excellent adherence of the adhesive to both the honeycomb core material and the facesheet results in a bond superior to the prior art shown in FIG. 7.

EXAMPLE I

Aluminum foil is received in coil form and continuously unrolled therefrom into a continuous processing apparatus. Both surfaces of the aluminum foil are subjected to a vapor degreasing with a solvent such as trichloroethylene to remove lubricants from the rolling process and other deposits. An alkaline cleaner such as Turco 4215 produced by Turco Products, Inc., Division of Purex Corp., Ltd., Wilmington, California, is then utilized to thoroughly clean both surfaces of the aluminum foil. The aluminum foil is then thoroughly rinsed to remove the alkaline cleaner and transported to an anodization bath containing approximately 30% by weight phosphoric acid. An anodization potential is imposed with the aluminum film being the anode. A potential of 5 volts is utilized. The aluminum foil is then anodized for a period of approximately 30 seconds and removed from the anodization bath. The phosphoric acid remaining on the surface is removed in a water rinse and both sides of the aluminum foil are dried in hot air. An adhesive, corrosion inhibiting, epoxy primer is applied to a coating thickness of approximately 2/10 of 1 mil. The primer utilized is a modified epoxy primer produced by American Cyanimide Corp. under the trade designation BR 127. The primer-coated coil is then baked to cure the primer.

The adhesive required for the node bonds in the honeycomb is then applied by well-known techniques such as stenciling or printing, and the aluminum foil cut and stacked into position for curing of the adhesive. Depending upon the type of adhesive, the stacked foil is treated by heating or otherwise activating the adhesive for bonding purposes. The honeycomb core is then expanded into the condition in which a substantially regular hexagon is formed as each honeycomb cell. A primed aluminum facesheet coated with adhesive is then applied to each side of the expanded core and heated to bond the primed facesheet to the core with a strong fillet of adhesive extending into the honeycomb core cells. The finished product resulting from this process is an environmentally stabel honeycomb structure having substantially increased resistance to corrosion and hydration of the oxide surface and substantially increased bond strength both at the honeycomb nodes and at the facesheet-core bonding location.

The polymers which produce the type of primer coatings useful in this invention on aluminum surfaces are generally referred to as film-forming, organic polymers. Examples of such film-forming polymers are (1) polycarbonate resins such as poly (bisphenol-A-carbonate); (2) acrylic resins such as copolymers with esters of acrylic and methacrylic acids, a specific suitable resin being a copolymer of methal acrylic and methal methacrylic; (3) epoxy resins such as glycidyl ether of bisphenol A cured with triethylene tetramine; (4) polyimide resins; (5) poyurethane resins; (6) hydrocarbon polymers such as polypropelene and polyethylene; and (7) phenolic resins.

The film-forming polymers used in this invention are preferably those which are dispersed in a carrier and may be applied by spraying, brushing or other well-known application means. The electrostatic deposition and electrophoresis techniques of application may also be utilized.

The preferred film-forming polymer is a heat-curing epoxy resin primer. The preferred epoxy resin primer is exemplified by an air drying-type, epoxy primer coating material which is manufactured by American Cyanamide under the trade designation BR 127. Other well-known primers and film-forming polymers may be substituted.

Adhesives which find use in forming the node bond structures in this invention include commercially available adhesive resins in thin film or sheet form or in a liquid sprayable or brushable compostion. Examples of such adhesives are the high-bonding strength themal setting resins such as the modified block copolyer epoxy and polyimide resins. Two resin compositions available in sheet form that have been found satisfactory for use with processes and apparatus of the present invention are the epoxy resins sold under the product designation PL-729-300 by the B. F. Goodrich Chemical Company, Cleveland, Ohio, and the products designated AF-453, and AF-126 manufactured and sold by Minnesota Mining & Manufacturing Corporation, Minneapolis, Minnesota. These adhesives are conventionally sold in an uncured form for application by the user. It is sufficient that the adhesive be in a form which may be applied in the configuration necessary to form the honeycomb node bonds and be curable at conditions to which the stacked elements may be subjected. For example, adhesive in a sheet form may have portions thereof removed and layed down in sheet form serially upon each aluminum foil sheet during the stacking process. The adhesive preferably is of a type which will cure at an elevated temperature in the range of 200° F. to 400° F., however, adhesives curing at room temperature or slightly elevated therefrom may be used to form a strong bond between adjacent sheets of aluminum foil. Alternatively, the adhesive may be applied as by printing or other techniques well-known in the art in the form of a liquid which similarly will cure at a temperature in the range of room temperature up to about 400° F.

Although the present invention has been described with specific reference to preferred embodiments, it is to be understood that modifications and variations may be made to the invention without departing from the spirit and scope thereof as those with ordinary skill in the art equipped with the teaching herein will readily understand. Such modifications and variations are considered to be within the purview and scope of the invention and the appended claims.

We claim as our invention:

1. A method of forming an environmentally durable, corrosion resistant honeycomb core structure from aluminum metal comprising the steps of:

preparing a polymer receptive oxide coating on both surfaces of an aluminum foil by anodization of said aluminum foil in phosphoric acid said anodization taking place at a temperature in the range of about 75° F to 160° F. for 0.1 to 30 minutes at a potential of from 5 to 50 volts with phosphoric acid concentration of 5% to 50%;
   applying a thin coating of an organic resin primer to said surfaces;
   curing said primer to a coherent film to form a primed aluminum foil;
   emplacing an adhesive on said primed aluminum foil, said adhesive being placed in locations chosen to from node bonds in a honeycomb structure;
   stacking said foil;
   curing said adhesive to form bonds between adjacent layers of primed aluminum foil to form a bonded stack of aluminum foil layers;
   expanding said stack to form honeycomb cells therein forming a honeycomb core; and
   bonding a face sheeet to opposed end edge surfaces of said core with an adhesive which wets the surfaces of said primed aluminum foil to from fillets extending into said honeycomb cells;
   whereby a honeycomb core panel assembly is formed having all metal surfaces of said core coated with corrosion resistant, organic coating to render said core environmentally stable and resistant to corrosion.

2. The process of claim 1 wherein said facesheets are primed on at least a core engaging surface thereof prior to assembly.

3. The process of claim 1 wherein said polymer receptive coating is formed by anodization in phosphoric acid at the following conditions:
   Temperature — 130 ± 5° F.
   Potential (Volts) — 5 to 10
   Time — 0.2 to 2 minutes
   $H_3PO_4$ Concentration — 30 ± 2% by weight
   Current Density (amp/ft$^2$) — 15 to 22.

4. The process of claim 1 wherein said adhesive bonding said face sheet to said core comprises an adhesive which wets the surface of said primer nd extends in a fillet into said honeycomb core forming a strong bond between said face sheet and said primed aluminum foil.

5. An aluminum honeycomb core structure comprising a honeycomb core formed of aluminum foil, said aluminum foil having a polymer receptive surface thereon and being primed over its entire surface prior to emplacement of node bond adhesive and stacking and bonding; and
   at least one facesheet means adhered to one end edge surface of said core;
   wherein said polymer receptive surface is an oxide coating formed by anodization of said foil in phosphoric acid, said anodization taking place under the following conditions:
   Temperature — 75° to 160° F.
   Potential (volts) — 1 to 50
   Time — 0.1 to 30 minutes
   $H_3PO_4$ Concentration — 5 to 50% by weight
   Current Density (amp/ft$^2$) — 1 to 200.

6. The product produced by the process of claim 3.

7. The product produced by the process of claim 1.